US010415625B2

United States Patent
Mohr et al.

(10) Patent No.: US 10,415,625 B2
(45) Date of Patent: Sep. 17, 2019

(54) FASTENING DEVICE FOR FIXING AN EXHAUST MANIFOLD ON A CYLINDER HEAD OF AN INTERNAL COMBUSTION ENGINE

(71) Applicant: Eberspächer Exhaust Technology GmbH & Co. KG, Neunkirchen (DE)

(72) Inventors: Ralf Mohr, Heidelberg (DE); Arnulf Spieth, Hochdorf (DE); Jürgen Häberle, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 204 days.

(21) Appl. No.: 15/424,237

(22) Filed: Feb. 3, 2017

(65) Prior Publication Data

US 2017/0227043 A1 Aug. 10, 2017

(30) Foreign Application Priority Data

Feb. 4, 2016 (DE) .......................... 10 2016 101 980
Feb. 18, 2016 (DE) .......................... 10 2016 102 844

(51) Int. Cl.
*F16B 39/12* (2006.01)
*F01N 13/10* (2010.01)
*F16B 5/02* (2006.01)

(52) U.S. Cl.
CPC .......... *F16B 39/122* (2013.01); *F01N 13/10* (2013.01); *F16B 5/025* (2013.01); *F16B 5/0241* (2013.01); *F01N 2450/24* (2013.01)

(58) Field of Classification Search
CPC ...... F16B 39/122; F16B 5/0241; F16B 5/025; F01N 13/10; F01N 2450/24
(Continued)

(56) References Cited

U.S. PATENT DOCUMENTS

2014/0305108 A1* 10/2014 Maeda ................ F01N 13/1805
60/323

FOREIGN PATENT DOCUMENTS

DE  10 2008 049 093 A1  4/2010
DE  10 2010 025657 A1   1/2012
(Continued)

OTHER PUBLICATIONS

Dubbel: Taschenbuch fur den Maschinenbau; Grote, Karl-Heinrich; Feldhusen, Jorg; Springer Verlag; Berlin, Heidelberg; 2011.
(Continued)

*Primary Examiner* — Audrey K Bradley
*Assistant Examiner* — Kelsey L Stanek
(74) *Attorney, Agent, or Firm* — McGlew and Tuttle, P.C.

(57) ABSTRACT

A fastening device, fixing an exhaust manifold (12) on a cylinder head (14) of an internal combustion engine, has a contact surface (20) supported relative to a cylinder head contact surface (22). A fastening edge area (16) has a wedge fastening flange area (24) with a fastening element support surface (26) inclined in relation to the contact surface (20) that has a wedge angle ($W_1$). A fastening element (38) is pressed against the fastening element support surface (26) with a fastening flange support surface (40) with a fastening bolt unit (30) supported in relation to the cylinder head (14). The wedge angle ($W_1$) and a coefficient of static friction ($\mu$) of the frictional interaction of the fastening element (38) in relation to the exhaust manifold (12) is defined by: $0 < W_1 < 2 \tan^{-1}(\mu)$, in which $W_1$ is the wedge angle, and $\mu$ if the coefficient of static friction.

20 Claims, 2 Drawing Sheets

(58) Field of Classification Search
USPC .......................................................... 60/323
See application file for complete search history.

(56) References Cited

FOREIGN PATENT DOCUMENTS

| | | | | |
|---|---|---|---|---|
| FR | 2 925 588 A1 | 6/2009 | | |
| FR | 2925588 A1 * | 6/2009 | ............ | F01N 13/10 |
| JP | H10 47052 A | 2/1998 | | |
| JP | 2010-223160 A | 10/2010 | | |
| WO | 2011/113790 A1 | 9/2011 | | |

OTHER PUBLICATIONS

Handbuch Verbrennungsmotor: Grundlagen, Komponenten, Systeme, Perspektiven; Basshuysen, Richard; Schafer, Fred; Springer Fachmedien, Wiesbaden 2015.

* cited by examiner

FASTENING DEVICE FOR FIXING AN EXHAUST MANIFOLD ON A CYLINDER HEAD OF AN INTERNAL COMBUSTION ENGINE

CROSS REFERENCE TO RELATED APPLICATIONS

This application claims the benefit of priority under 35 U.S.C. § 119 of German Applications 10 2016 101 980.1 filed Feb. 4, 2016 and 10 2016 102 844.4 filed Feb. 18, 2016, the entire contents of which are incorporated herein by reference.

FIELD OF THE INVENTION

The pertains to a fastening device for fixing an exhaust manifold on a cylinder head of an internal combustion engine.

BACKGROUND OF THE INVENTION

An exhaust manifold, elongated along the bank of cylinders, which thus also receives the exhaust gases being discharged from the cylinders and is generally also called exhaust manifold, is fixed on an exhaust side of the cylinder head in internal combustion engines used in motor vehicles, which are configured, in general, as multicylinder internal combustion engines with at least one bank of cylinders formed in a cylinder block. The exhaust manifold has an essentially flat contact surface, which is supported in relation to a likewise essentially flat contact surface of the cylinder head via the intermediary of a sealing element. The exhaust manifold has respective fastening edge areas on its longitudinal sides. Fastening elements supported on the fastening edge areas by fastening bolt units fixed on the cylinder head by, for example, screw connection are pressed against the fastening edge areas and against respective fastening element support surfaces provided there and against the cylinder head, so that the exhaust manifold is pressed against the contact surface of the cylinder head, of course, via the intermediary of the aforementioned sealing element to establish a gastight closure.

It may be necessary for structural reasons not to arrange the fastening bolt units supported in relation to the cylinder head, on the one hand, and to a fastening element, on the other hand, at right angles to the contact surface of the at least one of the fastening edge areas, but inclined in relation thereto in order to have access to the fastening bolt units when fixing the exhaust manifold on the cylinder head. This inclined arrangement of the fastening bolt units on at least one of the fastening edge areas requires a wedge-like configuration of a fastening flange area, which is provided on this fastening edge area and on which the fastening element pressed by these fastening bolt units against the fastening edge area is supported. Lateral forces, which stress the exhaust manifold in the direction of its other fastening edge area as well as the fastening bolt units provided there and the fastening element provided there are generated due to this inclined arrangement of the fastening bolt units and the wedge-like configuration of the fastening flange area.

Just as the cylinder head, the exhaust manifold is subject to a high thermal load and high mechanical stress during the operation of an internal combustion engine. The heat-induced expansions and contractions occurring at the beginning of a combustion operation and after the end of a combustion operation repeatedly give rise to forces in the area of the fixing of the exhaust manifold on the cylinder head as well, and these forces also exert a great stress on the fastening bolt units used to fix the exhaust manifold on the cylinder head and, also supported by the vibrations occurring during the combustion operation, these forces may also lead to a loosening of fastening bolt units and to an installed position deviating from the desired installed position of the exhaust manifold in relation to the cylinder head.

SUMMARY OF THE INVENTION

The object of the present invention is to provide a fastening device for fixing an exhaust manifold on a cylinder head of an internal combustion engine, which guarantees fixing of the exhaust manifold on the cylinder head, which is stable under high thermal load and high mechanical stress and is secured against undefined motions.

This object is accomplished according to the present invention by a fastening device for fixing an exhaust manifold on a cylinder head of an internal combustion engine, wherein the exhaust manifold has an essentially flat first contact surface for supporting in relation to an essentially flat second contact surface of the cylinder head, wherein the exhaust manifold has, in a first fastening edge area, a wedge-like first fastening flange area with a first fastening element support surface inclined in relation to the first contact surface by a first wedge angle, wherein a first fastening element is pressed or can be pressed by means of at least one first fastening bolt unit that is supported or can be supported in relation to the cylinder head against the first fastening element support surface, wherein the first wedge angle and a coefficient of static friction of the frictional interaction of the first fastening element in relation to the exhaust manifold are defined by:

$$0 < W_1 < 2\tan^{-1}(\mu),$$

in which
$W_1$ is the first wedge angle, and
$\mu$ is the coefficient of static friction.

By selecting the first wedge angle in the range indicated above, it is guaranteed that the forces oriented essentially parallel to the support surfaces of the exhaust manifold, which surfaces are prestressed in relation to one another, on the one hand, and of the cylinder head, on the other hand, which forces could lead, in principle, to a transverse load or transverse displacement of the exhaust manifold in relation to the cylinder head because of the wedge-like configuration of the first fastening flange area, can occur only to an extent not substantially exceeding a friction cone. It is guaranteed due to this limitation of the displacing forces acting on the exhaust manifold that an undesired displacement of the exhaust manifold or an undesired loosening of the fastening bolt units will not occur even in case of repeatedly occurring thermal load and mechanical stress.

Provisions may be made in an especially advantageous embodiment for $$0 < W_1 < \tan^{-1}(\mu)$$

and preferably $$W_1 = \tan^{-1}(\mu)$$

to apply to the first wedge angle and the coefficient of static friction.

It can be guaranteed in this way that the forces stressing the exhaust manifold basically in the direction of displacement are kept so weak that they cannot exceed the static frictional forces occurring between the first fastening flange area and the first fastening element and a transverse displacement of the exhaust manifold, induced by the forces exerted by means of the first fastening bolt units on the exhaust manifold minimized cannot occur.

In an alternative embodiment, in which the lateral forces slightly exceeding the static frictional forces resulting from frictional interaction are allowed, it is proposed that the first wedge angle and the coefficients of static friction be defined by $$\tan^{-1}(\mu) < W_1 < 2\tan^{-1}(\mu).$$

It is proposed for a support interaction between the first fastening element and the at least one first fastening bolt unit, which likewise essentially rules out lateral forces, that the first fastening element have a first fastening bolt unit support surface, which is essentially at right angles to a first fastening bolt longitudinal axis, for supporting the at least one first fastening bolt unit in relation to the first fastening element.

To make it possible to guarantee access to the at least one first fastening bolt unit for mounting the exhaust manifold, it is proposed that a first fastening bolt longitudinal axis of the at least one first fastening bolt unit be inclined with a first longitudinal axis angle in relation to the second contact surface beginning from the cylinder head in the direction of a free end of the first fastening flange area, preferably in the range of 50° to 70°, most preferably at about 60°. The first fastening bolt longitudinal axis of the at least one first fastening bolt unit is preferably located in a plane that is essentially at right angles to the second contact surface, which ultimately means that this first fastening bolt longitudinal axis is inclined essentially only outwardly, i.e., in the direction away from the exhaust manifold and in the direction of the free end of the first fastening flange area, but it is not inclined in the direction of the longitudinal extension of the exhaust manifold, in which direction this exhaust manifold extends along the bank of cylinders.

Further, to avoid transverse displacements between the at least one fastening bolt unit and the first fastening element in the interaction between these two assembly units, i.e., displacements essentially at right angles to the fastening bolt longitudinal axis of this at least one first fastening bolt unit, it is further proposed that a fastening bolt of the at least one first fastening bolt unit pass through a fastening bolt passage opening in the first fastening element essentially without clearance of motion at right angles to the first fastening bolt longitudinal axis.

To guarantee stable connection of the exhaust manifold to the cylinder head on the other side of the exhaust manifold as well, it is proposed that the exhaust manifold have, in a second fastening edge area, a second fastening flange area oriented essentially opposite the first fastening flange area with a second fastening element support surface inclined with a second wedge angle in relation to the first contact surface, wherein a second fastening element is pressed or can be pressed against the cylinder head by means of at least one second fastening bolt unit that is supported or can be supported in relation to the cylinder head and has a second fastening flange support surface inclined with a second wedge angle in relation to the second contact surface. The second fastening element can be fixed before mounting the exhaust manifold on the cylinder head, so that the exhaust manifold with its second fastening flange area having a likewise wedge-like configuration can be pushed under the second fastening element and fixing can subsequently be performed on the first fastening edge area by means of the first fastening element.

A second fastening bolt longitudinal axis of the at least one second fastening bolt unit is advantageously arranged in relation to the second contact surface with a second longitudinal axis angle, the second longitudinal axis angle being in the range of 90°.

The second wedge angle is preferably greater than the first wedge angle, and the second fastening element may have a second fastening bolt unit support surface extending essentially at right angles to the second fastening bolt longitudinal axis of the at least one second fastening bolt unit for supporting the at least one second fastening bolt unit of the second fastening element.

To make it possible to absorb the high thermal loads and mechanical stresses occurring during the combustion operation, the exhaust manifold may be made of steel, preferably ST52. The first fastening element engaging in frictional interaction with the exhaust manifold may also be made of steel, preferably likewise ST52. The coefficient of static friction acting between the exhaust manifold and the cylinder head is, for example, in the range of 0.10 to 0.14 and preferably in the range of 0.11 to 0.13, especially if steel material is used to construct these assembly units.

The present invention further pertains to an internal combustion engine, especially for a vehicle, comprising a cylinder head fixed on a cylinder block and an exhaust manifold fixed on the cylinder head by means of a fastening device according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
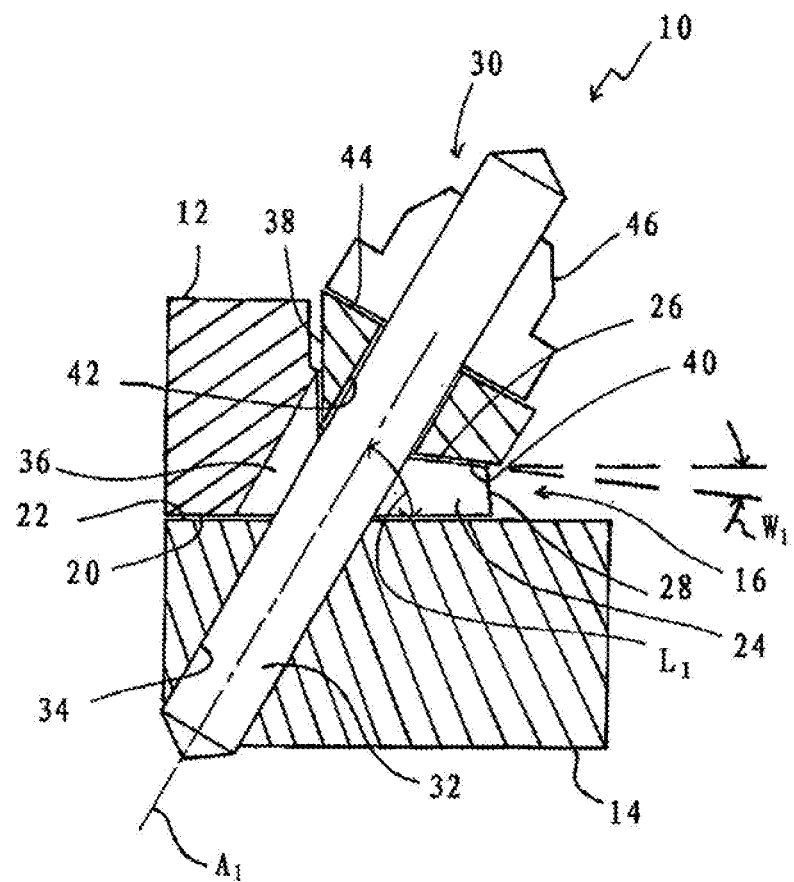
FIG. 1 is a schematic cross-sectional view of an exhaust manifold connected to a cylinder head in a first fastening edge area.
Figure 2:
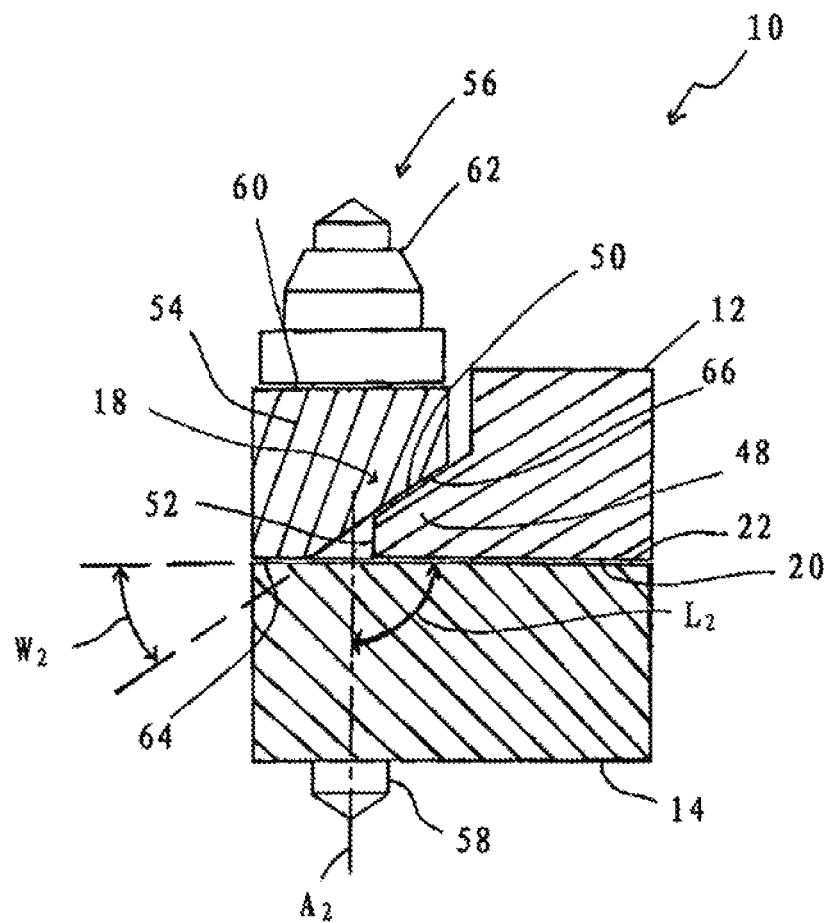
FIG. 2 is a view corresponding to FIG. 1, which shows the fixing of the exhaust manifold on the cylinder head in a second fastening edge area of the exhaust manifold.

Referring to the drawings, FIGS. 1 and 2 show in simplified views a fastening device generally designated by 10, by means of which an exhaust manifold 12 can be fixed on a cylinder head 14 of an internal combustion engine. FIG. 1 shows the fixing of the exhaust manifold 12 on the cylinder head 14 in a first fastening edge area 16 of the exhaust manifold 12, while FIG. 2 shows the fixing of the exhaust manifold 12 on the cylinder head 14 in a second fastening edge area 18 of the exhaust manifold 12. It should be noted that the exhaust manifold 12 may extend elongated, in principal, at right angles to the drawing planes of FIGS. 1 and 2 and may extend with its longitudinal extension direction along the cylinders provided in a cylinder block.

The exhaust manifold 12 has a first contact surface 20 having a flat configuration, which is located opposite a second contact surface 22 of the cylinder head 14. As will be described below, the exhaust manifold 12 is exposed to exhaust gas in the direction of the second contact surface 22, and a sealing element, not shown in the figures, is positioned between the first contact surface 20 and the second contact surface 22 to achieve a gastight closure.

In the first fastening edge area 16, the exhaust manifold 12 has a first fastening flange area 24 having a wedge-like configuration. This area is defined in the direction of the cylinder head 14 by the first contact surface 20 and is defined by a fastening element support surface 26 in the direction away from the cylinder head 14. A first wedge angle $W_1$ is formed between the first contact surface 20 and the first fastening element support surface 26, so that the first fastening flange area 24 is configured such that it tapers in the direction of a free end 28 thereof.

To fix the exhaust manifold 12 in its first fastening edge area 16 at the cylinder head 14, a plurality of fastening bolt units 30 are provided, which follow each other in the direction of the longitudinal extension of the exhaust manifold 12, i.e., at right angles to the drawing plane of FIG. 1. Each of these first fastening bolt units 30 comprises a fastening bolt 32, generally also called stud bolt, which is inserted, preferably screwed, into an associated opening 34 in the cylinder head 14. The fastening bolt 32 is consequently preferably configured as an external thread bolt, and the opening receiving same in the cylinder head 14 is configured as an internally threaded opening.

Associated with each first fastening bolt unit 30, a fastening bolt passage opening 36 open, for example, towards the free end 28 of the fastening flange area 24 is formed in said first fastening flange area 24. The fastening bolt 32 extends through this fastening bolt passage opening 36 starting from the cylinder head 14 with its first fastening bolt longitudinal axis A1, inclined at a first longitudinal axis angle L1 outwardly in relation to the second contact surface 22, i.e., in the direction away from the exhaust manifold 12 and in the direction of the free end 28 of the first fastening flange area 24. The first fastening bolt longitudinal axis A1 is preferably located in a plane extending at right angles to the second contact surface 22 and thus consequently essentially also to the plane corresponding to the drawing plane of FIG. 1. The fastening bolt 32 thus has no inclination angle component in the direction of the longitudinal extension of the exhaust manifold 12.

Associated with the first fastening flange area 24, the fastening device 10 further has a first fastening element 38. The first fastening element 38 extends in the direction of the longitudinal extension of the exhaust manifold 12 preferably over the entire first fastening edge area 16 and thus interacts with the first fastening bolt units 30 following each other in this longitudinal extension direction of the exhaust manifold 12.

The first fastening element 38 has a first fastening flange support surface 40, with which this element is in contact with the first fastening element support surface 26 of the first fastening flange area 24. Associated with each first fastening bolt unit 30, the first fastening element 38 has a fastening bolt passage opening 42, in which a respective fastening bolt 32 is received essentially without clearance of motion at right angles to its first fastening bolt longitudinal axis A1. Consequently, the most accurate fitting possible is provided, which makes it possible, on the one hand, to push the first fastening element 38 over the fastening bolt 32, but, on the other hand, does not essentially allow transverse displacements of the first fastening element 38 in relation to the fastening bolt 32.

On the side facing away from the first fastening flange area 24 and hence from the first fastening element support surface 26, the first fastening element 38 has a fastening bolt unit support surface 44. A lock nut 46, which has or can be caused to have a thread meshing with the fastening bolt 32, can be supported either directly or via a shim element on this fastening bolt unit support surface 44 oriented essentially at right angles to the first fastening bolt longitudinal axis A1. A force directed essentially in the direction of the first fastening bolt longitudinal axis A1 and hence correspondingly inclined in relation to the second contact surface 22, which force presses the first fastening element 38 against the first fastening flange area 24 and thus consequently the first fastening flange support surface 40 against the first fastening element support surface 26, is exerted by said lock nut 46 on the first fastening element 38 when the lock nut is tightened.

The exhaust manifold 12 also has a second fastening flange area 48 having an essentially wedge-like configuration in the second fastening edge area 18 shown in FIG. 2. The second fastening flange area 48 has a second fastening element support surface 50 inclined at a second wedge angle W2 in relation to the first contact surface 20 and hence also to the second contact surface 22. The second fastening flange area 48 is also tapered towards its free end 52 and is thus oriented essentially opposite the first fastening flange area 24.

Associated with the second fastening flange area 48, the fastening device 10 comprises a second fastening element 54. This is fixed on the cylinder head 14 by a plurality of second fastening bolt units 56 following each other in the direction of the longitudinal extension of the exhaust manifold 12. Every other fastening bolt unit 56 comprises a fastening bolt 58, which is inserted into an associated opening of the cylinder head 14 and is preferably held therein by thread meshing. The fastening bolts 58 of the second fastening bolt units 56 are thus preferably also configured as externally threaded bolts, while the openings receiving these in the cylinder head 14 are configured as internally threaded openings. It can be seen in FIG. 2 that the fastening bolts 58 are arranged with their second fastening bolt longitudinal axes A2 at a second longitudinal axis angle L2 of 90° in relation to the second contact surface 22. The fastening bolts 58 thus extend essentially at right angles in relation to the second contact surface 22 and also have no inclination angle component in the direction of the longitudinal extension direction of the exhaust manifold 12.

The fastening bolts 58 of the second fastening bolt units 56 pass through respective fastening bolt passage openings associated with them in the fastening element 54. On a side facing away from the second contact surface 22 of the cylinder head 14, the fastening element 54 has a second fastening bolt unit support surface 60, which is essentially at right angles to the respective second fastening bolt longitudinal axis A2 of the fastening bolts 58 and on which a lock nut 62 that has or can be caused to have thread meshing with the fastening bolt 58 of a respective second fastening bolt unit 56 is supported or can be supported either directly or via the intermediary of a shim. The second fastening element 54 is pressed with a cylinder head support surface 64 against the second contact surface 22 of the cylinder head 14 by the lock nuts 62 of the second fastening bolt units 56. The fastening element 54 is thus held in a defined position in relation to the cylinder head 14 by means of the second fastening bolt units 56. For example, the fastening bolt passage openings formed in the second fastening element 54 for the fastening bolts 58 of the second fastening bolt units 56 have such a dimensioning that the fastening bolts 58 are again received in these fastening bolt passage openings essentially without clearance of motion at right angles to their second fastening bolt longitudinal axes A2, so that the second fastening element 54 is held essentially immovably in a defined position not only in the direction at right angles back to the mounting surface 22, but also in the direction parallel to the second contact surface 22.

Associated with the second fastening flange area 48 of the exhaust manifold 12, a second fastening flange support surface 66 is provided on the second fastening element 54. This support surface 66 is inclined in relation to the second contact surface 22 and hence also in relation to the first contact surface 20 with a second wedge angle W2, with which the second fastening element support surface 50 of the fastening flange area 43 is also inclined in relation to these surfaces. A wedge-like undercut, in which the second fastening flange area 48 can be positioned such that it meshes with same, is thus formed between the second fastening flange support surface 66 and the second contact surface 22. Based on the identical angulations of the two surfaces 50, 66, the second fastening element 54 and the exhaust manifold 12 are in contact with one another in the area of these surfaces, establishing a surface contact providing a uniform load. In the area in which the fastening bolts 58 of the second fastening bolt units 56, following each other in the longitudinal extension direction of the a 12, extend out of the cylinder head 14, recesses open towards the free end 52 of the second fastening flange area 48 may be formed in said second fastening flange area 48, and the fastening bolts 58 can partially mesh with said recesses or the fastening bolts 58 can extend through said recesses.

To make it possible to absorb the thermal loads and mechanical stresses occurring during the operation and to guarantee stable connection of the exhaust manifold 12 to the cylinder head 14, the exhaust manifold 12 and the two fastening elements 38, 54 are preferably made of steel material, for example, ST52. The cylinder head 14 is made, for example, of an aluminum material. The fastening bolt units 30, 56, especially their fastening bolts 32, 58, are preferably likewise made of a steel material, which guarantees the necessary connection strength and the load-bearing capacity of the fastening bolts 32, 58 even at right angles to the fastening bolt longitudinal axes A1, A2 thereof even in a support interaction with the cylinder head 14, on the one hand, and with the fastening elements 38, 54.

To mount the exhaust manifold 12 on the cylinder head 14, it is possible to proceed, for example, such that the fastening bolts 58 of the second fastening bolt units 56, optionally also the fastening bolts 32 of the first fastening bolt units 30, are first inserted into the cylinder head 14 with the required depth of insertion. The second fastening element is then pushed over the fastening bolts 58 and pressed by the lock nuts 62 of the second fastening bolt units 56 against the second contact surface 22 of the cylinder head 14. Unless it had been done already, the fastening bolts 32 of the first fastening bolt units 30 are then inserted into the cylinder head 14 with the necessary depth of insertion, i.e., for example, they are screwed in. The sealing element, not shown in the figures, is then placed on the second contact surface 22, so that it lies essentially between the two rows of fastening bolts 32, 58 in the position intended for installation. The exhaust manifold 12 is subsequently moved towards the cylinder head 14, doing so such that the second fastening flange area 18 meshes with its second fastening element support surface 50 under the second fastening flange support surface 66 of the second fastening element 54. The exhaust manifold 12 can be pivoted in the course of this procedure such that its first contact surface 20 comes close to the second contact surface 22 or the sealing element positioned thereon. The first fastening flange area 24 with the fastening bolt passage openings 36 formed thereon moves during this motion over the fastening bolts 32 of the first fastening bolt 30, until the exhaust manifold 12 becomes flatly supported in relation to the cylinder head 14 via the intermediary of the element, i.e., the two contact surfaces 20, 22 are positioned essentially parallel to one another.

The first fastening element 38 with its fastening bolt passage openings 42 is subsequently pushed over the fastening bolts 32 of the first fastening bolt units 30 and the first fastening element 38 with its first fastening flange support surface 40 is thus positioned such that it is in contact with the first fastening element support surface 26. By mounting and tightening the lock nuts 46 of the first fastening bolt units 30, the first fastening element 38 is pressed against the first fastening flange area 24. Forces, which can act on and displace the exhaust manifold 12 to the left, i.e., in the direction of the second fastening element 54 fixed on the cylinder head 14 in both views shown in FIGS. 1 and 2, may develop because of the inclination of the fastening bolts 32 and because of the configuration of the second fastening flange area 24.

To avoid the development of excessively strong lateral forces, i.e., forces stressing the exhaust manifold 12 essentially at right angles to the cylinder head 14, the first wedge angle $W_1$ is selected, according to the principles of the present invention, such that it meets the following condition:

$$0 < W_1 < 2\,\tan^{-1}(\mu).$$

Here, $\mu$ is the coefficient of static friction, also called coefficient of friction, which occurs in the area of the first fastening element support surface 26 and the fastening flange support surface 40, which are in contact with one another. This is determined essentially by the materials of which the two components that are in contact with one another with these surfaces 26, 40, namely, the exhaust manifold 12 and the first fastening element 38, are made. As was indicated above, these two components are preferably made of a steel material, for example, ST52, so that a coefficient of static friction in the range of 0.11 to 0.13 will be obtained in this area of mutual contact. Taking this into account, it is obtained for the first wedge angle $W_1$ that according to the principles of the present invention, this is not greater than twice the inverse tangent of this coefficient of static friction. An upper limit value in the range of about 14.81° is thus obtained for this first wedge angle $W_1$ for the material pair mentioned at a coefficient of static friction of, e.g., 0.13. In an especially preferred embodiment, this first wedge angle $W_1$ should not, however, be greater than the simple inverse tangent of the coefficient of static friction, i.e., it should not be greater than 7.41°.

When selecting the first wedge angle $W_1$ in the area indicated above and especially also in such a way that the second wedge angle W2 is greater than the first wedge angle $W_1$, the development of excessively strong forces, which can lead to an excessively great displacement of the exhaust manifold 12 in the direction of the fastening element 54, especially during thermal expansion and contraction, is avoided. By avoiding an excessively great displacement, loosening of the different fastening bolt units, especially of the first fastening bolt units 30 based on a displacement of the first fastening flange area 24 in relation to the first fastening element 38 to the left in the view shown in FIG. 1 is also avoided or a necessary tightening torque will not be maintained even during a prolonged operating time. The wedge-like configuration especially of the first fastening flange area 24 nevertheless makes possible the thermal expansions and contractions of the different components, which unavoidably occur during the operation of an internal combustion engine, without an undefined, excessive relative motion between the exhaust manifold 12 and the cylinder head 14 or without loosening of the fastening bolt units.

Provisions may be made in an especially preferred embodiment for the first $W_1$ to correspond essentially to the inverse tangent of the coefficient of static friction μ. Consequently, the first wedge angle $W_1$ corresponds in this case essentially to the friction angle or friction cone angle. It can thus be ensured that substantial lateral forces, which lead to a displacement of the cylinder head 14, do not occur. If the first wedge angle $W_1$ is selected to be such that it is somewhat greater than the inverse tangent of the coefficient of static friction μ, limited lateral forces may occur, but an excessive stress on the cylinder head 14 in the transverse direction is avoided.

Finally, it should be noted that the embodiment of a fastening device according to the present invention or of an internal combustion engine configured with such a fastening device can be embodied in an especially advantageous manner especially where the exhaust manifold is fixed on the cylinder head. However, such a fastening device could also be used, in principle, to fix an intake manifold on a cylinder head.

While specific embodiments of the invention have been shown and described in detail to illustrate the application of the principles of the invention, it will be understood that the invention may be embodied otherwise without departing from such principles.

What is claimed is:

1. A fastening device for fixing an exhaust manifold on a cylinder head of an internal combustion engine, wherein the exhaust manifold has a flat contact surface for being supported in relation to a flat cylinder head contact surface, the fastening device comprising:
   an exhaust manifold fastening edge area with a wedge fastening flange area with a fastening element support surface inclined in relation to the exhaust manifold contact surface and with a wedge angle;
   a fastening element having a fastening flange support surface; and
   a fastening bolt unit supported in relation to the cylinder head and pressing the fastening element against the fastening element support surface, wherein the wedge angle and a coefficient of static friction of a frictional interaction of the fastening element in relation to the exhaust manifold are defined by: $0<W_1<2\tan^{-1}(\mu)$, in which $W_1$ is the wedge angle, and μ is the coefficient of static friction.

2. The fastening device in accordance with claim 1, wherein the wedge angle and the coefficient of static friction are defined by: $0<W_1<\tan^{-1}(\mu)$.

3. The fastening device in accordance with claim 1, wherein the wedge angle and the coefficient of static friction μ are defined by: $\tan^{-1}(\mu)<W_1<2\tan^{-1}(\mu)$.

4. The fastening device in accordance with claim 1, wherein the fastening element comprises a fastening bolt unit support surface that is at right angles to a fastening bolt longitudinal axis of the fastening bolt unit for supporting the fastening bolt unit in relation to the fastening element, the fastening bolt unit arranged such that the fastening bolt longitudinal axis is not perpendicular to the flat cylinder head contact surface.

5. The fastening device in accordance with claim 1, wherein:
   a fastening bolt longitudinal axis of the fastening bolt unit is inclined at a longitudinal axis angle in relation to the flat cylinder head contact surface, starting from the cylinder head, in the direction of a free end of the fastening flange area, in the range of 50° to 70°; or
   a fastening bolt longitudinal axis of the fastening bolt unit is located in a plane that is at right angles to the flat cylinder head flat contact surface; or
   a fastening bolt of the fastening bolt unit passes through a fastening bolt passage opening in the fastening element without clearance of motion at right angles to the fastening bolt longitudinal axis.

6. The fastening device in accordance with claim 1, further comprising:
   a second exhaust manifold fastening edge area with a second fastening flange area oriented opposite the fastening flange area with a second fastening element support surface inclined in relation to the exhaust manifold contact surface at a second wedge angle;
   a second fastening element; and
   a second fastening bolt unit pressing the second fastening element against the cylinder head, wherein the second fastening bolt unit is supported in relation to the cylinder head and has a second fastening flange support surface inclined in relation to the flat cylinder head contact surface at the second wedge angle.

7. The fastening device in accordance with claim 6, wherein the second fastening bolt unit has a second fastening bolt longitudinal axis arranged at a second longitudinal axis angle in relation to the flat cylinder head contact surface, wherein the second fastening bolt longitudinal axis angle is 90°.

8. The fastening device in accordance with claim 6, wherein the second wedge angle is greater than the wedge angle.

9. The fastening device in accordance with claim 6, wherein the second fastening element has a second fastening bolt unit support surface extending at right angles to a second fastening bolt longitudinal axis of the second fastening bolt unit in relation to the flat cylinder head contact surface for supporting the at least one second fastening bolt unit in relation to the second fastening element.

10. The fastening device in accordance with claim 1, wherein:
    the exhaust manifold is made of a steel; or
    the first fastening element is made of a steel; or
    the coefficient of static friction is in the range of 0.10 to 0.14; or
    any combination of the exhaust manifold is made of a steel and the first fastening element is made of a steel and the coefficient of static friction is in the range of 0.10 to 0.14.

11. The fastening device in accordance with claim 1, wherein the wedge angle and the coefficient of static friction are defined by $W_1=\tan^{-1}(\mu)$.

12. An internal combustion engine comprising:
    a cylinder head fixed on a cylinder block;
    an exhaust manifold; and
    a fastening device fixing the exhaust manifold on the cylinder head, the fastening device comprising:
    an exhaust manifold fastening edge area with a wedge fastening flange area with a fastening element support surface inclined in relation to a manifold contact surface of the exhaust manifold and with a wedge angle;

a fastening element having a fastening flange support surface; and a fastening bolt unit supported in relation to the cylinder head and pressing the fastening element against the fastening element support surface, wherein the wedge angle and a coefficient of static friction define a frictional interaction of the fastening element in relation to the exhaust manifold is defined by: $0<W_1<2\tan^{-1}(\mu)$, in which $W_1$ is the wedge angle, and $\mu$ is the coefficient of static friction.

13. The internal combustion engine in accordance with claim 12, wherein the wedge angle and the coefficient of static friction are defined by: $0<W_1<\tan^{-1}(\mu)$.

14. The internal combustion engine in accordance with claim 12, wherein the wedge angle and the coefficient of static friction $\mu$ are defined by $\tan^{-1}(\mu)<W_1<2\tan^{-1}(\mu)$.

15. The internal combustion engine in accordance with claim 12, wherein the fastening element comprises a fastening bolt unit support surface that is at right angles to a fastening bolt longitudinal axis of the fastening bolt unit for supporting the fastening bolt unit in relation to the fastening element, the fastening bolt unit being arranged such that the fastening bolt longitudinal axis is not perpendicular to a flat cylinder head contact surface of the cylinder head.

16. The internal combustion engine in accordance with claim 12, wherein:

a fastening bolt longitudinal axis of the fastening bolt unit is inclined at a longitudinal axis angle in relation to a flat cylinder head contact surface, starting from the cylinder head, in the direction of a free end of the fastening flange area, in the range of 50° to 70°; or a fastening bolt longitudinal axis of the fastening bolt unit is located in a plane that is at right angles to the cylinder head essentially flat contact surface; or a fastening bolt of the fastening bolt unit passes through a fastening bolt passage opening in the fastening element without clearance of motion at right angles to the fastening bolt longitudinal axis.

17. The internal combustion engine in accordance with claim 12, further comprising:

a second exhaust manifold fastening edge area with a second fastening flange area oriented opposite the fastening flange area with a second fastening element support surface inclined in relation to the contact surface at a second wedge angle;

a second fastening element; and a second fastening bolt unit pressing the a second fastening element against the cylinder head, wherein the a second fastening bolt unit is supported in relation to the cylinder head and has a second fastening flange support surface inclined in relation to the flat cylinder head contact surface at the second wedge angle.

18. The internal combustion engine in accordance with claim 17, wherein the second fastening bolt unit has a second fastening bolt longitudinal axis arranged at a second longitudinal axis angle in relation to the flat cylinder head contact surface, wherein the second fastening bolt longitudinal axis angle is 90°.

19. The internal combustion engine in accordance with claim 17, wherein the second wedge angle is greater than the wedge angle.

20. The internal combustion engine in accordance with claim 17, wherein the second fastening element has a second fastening bolt unit support surface extending at right angles to a second fastening bolt longitudinal axis of the second fastening bolt unit for supporting the at least one second fastening bolt unit in relation to the second fastening element.

\* \* \* \* \*